(12) United States Patent
Wimmer

(10) Patent No.: US 8,804,547 B2
(45) Date of Patent: Aug. 12, 2014

(54) ANALYZING COMMUNICATION CONFIGURATION IN A PROCESS CONTROL SYSTEM

(75) Inventor: Wolfgang Wimmer, Rietheim (CH)

(73) Assignee: ABB Technology AG, Zurich (CH)

( * ) Notice: Subject to any disclaimer, the term of this patent is extended or adjusted under 35 U.S.C. 154(b) by 771 days.

(21) Appl. No.: 12/543,246

(22) Filed: Aug. 18, 2009

(65) Prior Publication Data

US 2010/0039954 A1  Feb. 18, 2010

(30) Foreign Application Priority Data

Aug. 18, 2008  (EP) .................................... 08105066

(51) Int. Cl.
 *H04L 12/26* (2006.01)
 *G06T 15/00* (2011.01)
 *H04L 12/24* (2006.01)
 *H04L 12/46* (2006.01)

(52) U.S. Cl.
 CPC ......... H04L 41/0853 (2013.01); *H04L 12/4641* (2013.01); *Y04S 40/162* (2013.01)
 USPC ....................................................... 370/252

(58) Field of Classification Search
 CPC ..... Y04S 40/162; Y04S 40/168; H04L 41/12; H04L 41/0853
 USPC ............. 370/241, 252, 395.53; 709/223, 224, 709/225, 232
 See application file for complete search history.

(56) References Cited

U.S. PATENT DOCUMENTS 6,151,300 A * 11/2000 Hunt et al. ..................... 370/231
6,529,475 B1 * 3/2003 Wan et al. ..................... 370/231
6,711,127 B1 * 3/2004 Gorman et al. ............... 370/230
6,958,977 B1 * 10/2005 Mitrani et al. ................ 370/252
7,050,808 B2 * 5/2006 Janusz et al. .................. 455/445

(Continued)

FOREIGN PATENT DOCUMENTS

EP          2109204 A1 * 10/2009 .............. H02J 13/00
WO     WO 2008/011618       1/2008

OTHER PUBLICATIONS

European Search Report for EP 08105066.8 completed Dec. 18, 2008.
European Search Report for EP 08105067.6 dated Dec. 30, 2008.

(Continued)

*Primary Examiner* — Chi Pham
*Assistant Examiner* — Robert Lopata
(74) *Attorney, Agent, or Firm* — Buchanan Ingersoll & Rooney PC

(57) ABSTRACT

An analysis of a communication configuration in a process control (PC) or substation automation (SA) system is disclosed, wherein network messages, and/or respective message sources, configured for transmission across a communication network of the system can be evaluated. From a logical data flow description that is part of a standardized configuration representation of the PC or SA system and which includes, in the form of control blocks, formal information for every message, receiver intelligent electronic devices (IEDs) can be retrieved or determined. For each retrieved receiver IED, the totality of all network messages destined for or directed to this particular receiver IED can be evaluated or processed (e.g. in view of a subsequent network load analysis, virtual local area network assignment, or graphical display of the data flow). Exemplary network messages of interest include cyclic point-to-point reports, periodic or repeated real-time multicast messages (Sampled Values SV) and event-based multicast messages (generic object oriented substation events GOOSE).

16 Claims, 3 Drawing Sheets

(56) References Cited

U.S. PATENT DOCUMENTS

| | | | |
|---|---|---|---|
| 7,162,507 B2* | 1/2007 | Carter | 709/200 |
| 7,242,668 B2* | 7/2007 | Kan et al. | 370/234 |
| 7,664,869 B2* | 2/2010 | Baker et al. | 709/230 |
| 7,684,332 B2* | 3/2010 | Ray et al. | 370/235 |
| 7,693,607 B2* | 4/2010 | Kasztenny et al. | 700/286 |
| 7,746,791 B2* | 6/2010 | Wimmer | 370/242 |
| 7,746,799 B2* | 6/2010 | Kokot et al. | 370/252 |
| 7,873,594 B2* | 1/2011 | Harada et al. | 707/603 |
| 2006/0028999 A1* | 2/2006 | Iakobashvili et al. | 370/252 |
| 2006/0271670 A1* | 11/2006 | Blomquist et al. | 709/224 |
| 2007/0147415 A1* | 6/2007 | Marusca et al. | 370/465 |
| 2008/0052628 A1* | 2/2008 | Bugenhagen et al. | 715/736 |
| 2008/0127210 A1* | 5/2008 | Bosold et al. | 719/313 |
| 2008/0183406 A1* | 7/2008 | Lee et al. | 702/58 |
| 2010/0020715 A1* | 1/2010 | Monaco et al. | 370/252 |
| 2010/0039954 A1* | 2/2010 | Wimmer | 370/252 |
| 2010/0040068 A1* | 2/2010 | Wimmer | 370/395.53 |

OTHER PUBLICATIONS

Mladen Kezunovi et al., Automated Monitoring and Control Using New Data Integration Paradigm, Proceedings of the 38th Hawaii International Conference on System Sciences—2005. Jan. 3, 2005, pp. 1-10.

R.E. Mackiewicz, Overview of IEC 61850 and Benefits, May 21-24, 2006, pp. 1-8, Piscataway, New Jersey, USA.

Victor Manuel Flores et al., Case Study: Design and Implementation of IEC 61850 From Multiple Vendors at CFE La Venta II, Protective Relay Engineers, 2007, Mar. 1, 2007, pp. 307-320.

Eric A. Udren, "IEEE (ANSI) Device No. 16—Ethernet Switches and Routers", Protective Relay Engineers, 2008 61st Annual Conference for IEEE, Piscataway, NJ, USA, Apr. 1, 2009, pp. 247-272.

Tatjana Kostic et al., "Understanding and Using the IEC 61850: a case for meta-modelling", Computer Standards and Interfaces, Elsevier Sequoia, Lausanne, CH, vol. 27, No. 6, Jun. 1, 2005, pp. 679-695.

U.S. Patent Application filed on Aug. 18, 2009, entitled "Configuration of a Process Control System" naming Wolfgang Wimmer at inventor.

\* cited by examiner

Fig. 2

```
<DataSet name="Positions">        <!-- reported data in data set definition -->
  <FCDA ldInst="C1" prefix="" lnClass="LLN0" doName="Mod" fc="ST" />
  <FCDA ldInst="C1" prefix="QA1" lnClass="CSWI" lnInst="1" doName="Pos" fc="ST" />
  <FCDA ldInst="C1" prefix="QB1" lnClass="CSWI" lnInst="2" doName="Pos" fc="ST" />
  <FCDA ldInst="C1" prefix="QB2" lnClass="CSWI" lnInst="3" doName="Pos" fc="ST" />
  <FCDA ldInst="C1" prefix="QC1" lnClass="CSWI" lnInst="4" doName="Pos" fc="ST" />
  <FCDA ldInst="C1" prefix="QC2" lnClass="CSWI" lnInst="5" doName="Pos" fc="ST" />
</DataSet>

<ReportControl name="rcb_A" rptID="Positions" datSet="Positions" confRev="1">
  <TrgOps dchg="true" qchg="true" />
  <OptFields seqNum="true" dataSet="true" reasonCode="true" />
  <RptEnabled max="4">
    <!-- Report destinations: LNs on IEDs -->
    <ClientLN iedName="P2Y1" ldInst="LD0" lnInst="1" lnClass="ITCI" />
    <ClientLN iedName="AA1KA1" ldInst="None" lnInst="1" lnClass="ITCI" />
  </RptEnabled>
</ReportControl>

<GSEControl name="Interlock" datSet="Interlock" confRev="2" appID="Interlock">
  <!-- GOOSE destinations: IEDs -->
  <IEDName>P2KA3</IEDName>
  <IEDName>P2KA1</IEDName>
  <IEDName>P2KA2</IEDName>
</GSEControl>

<ConnectedAP iedName="P2KA4" apName="S2">
    <GSE ldInst="C1" cbName="Interlock">
      <Address>
        <P type="MAC-Address">01-0C-CD-01-00-02</P>
        <P type="APPID">3002</P>
        <P type="VLAN-PRIORITY">4</P>
      </Address>
      <MinTime unit="s">4</MinTime>
      <MaxTime unit="s">10000</MaxTime>
    </GSE>
```

ANALYZING COMMUNICATION CONFIGURATION IN A PROCESS CONTROL SYSTEM

RELATED APPLICATION

This application claims priority under 35 U.S.C. §119 to European Patent Application No. 08105066.8 filed in Europe on Aug. 18, 2008, the entire content of which is hereby incorporated by reference in its entirety.

FIELD

The disclosure relates to process control systems, such as substation automation systems.

BACKGROUND INFORMATION

Substations in high and medium-voltage power networks can include primary devices such as electrical cables, lines, bus bars, switches, power transformers and instrument transformers, which can be arranged in switch yards and/or bays. These primary devices are operated in an automated way via a substation automation (SA) system. An exemplary SA system includes secondary devices, so-called intelligent electronic devices (IED), responsible for protection, control and monitoring of the primary devices. The IEDs may be assigned to hierarchical levels, i.e. the station level, the bay level, and the process level, the latter being separated from the bay level by a so-called process interface. The station level of the SA system includes an operator work station (OWS) with a human-machine interface (HMI) and a gateway to a network control center (NCC). IEDs on the bay level, also termed bay units, in turn are connected to each other as well as to the IEDs on the station level via an inter-bay or station bus primarily serving the purpose of exchanging commands and status information.

IEDs on the process-level can include electronic sensors for voltage (VT), current (CT) and gas density measurements, contact probes for sensing switch and transformer tap changer positions, and/or intelligent actuators (I/O) for controlling switchgear like circuit breakers or disconnectors. Exemplary process-level IEDs such as non-conventional current or voltage transformers can include an analog to digital (AD) converter for sampling of analog signals. Process-level IEDs are connected to the bay units via a process bus, which can be considered as the process interface replacing a hard-wired process interface. The latter connects current or voltage transformers in the switchyard to the bay level equipment via dedicated Cu wires, in which case the analog signals of the instrument transformers can be sampled by the bay units.

A communication standard for communication between the secondary devices of a substation has been introduced by the International Electrotechnical Committee (IEC) as part of the standard IEC 61850 entitled "communication networks and systems in substations". For non-time critical messages, IEC 61850-8-1 specifies the Manufacturing Message Specification (MMS, ISO/IEC 9506) protocol based on a reduced Open Systems Interconnection (OSI) protocol stack with the Transmission Control Protocol (TCP) and Internet Protocol (IP) in the transport and network layers, respectively, and Ethernet and/or RS-232C as physical media. For time-critical event-based messages, IEC 61850-8-1 specifies the generic object oriented substation events (GOOSE) directly on the Ethernet link layer of the communication stack. For very fast periodically changing signals at the process level, such as measured analog voltages or currents, IEC 61850-9-2 specifies the Sampled Value (SV) service, which like GOOSE builds directly on the Ethernet link layer. Hence, the standard defines a format to publish, as multicast messages on an industrial Ethernet, event-based messages and digitized measurement data from current or voltage sensors on the process level. SV and GOOSE messages are transmitted over a process bus, which may, for example, in cost-effective medium or low voltage substations, extend to neighbouring bays, (i.e. beyond the bay to which the sensor is assigned). In the latter case, the process bus transmits, in addition to the process data, command and/or status related messages otherwise exchanged via a dedicated station bus. In the following, the distinction between process and station bus in SA systems is eliminated.

In communication systems technology, within Local Area Networks (LAN) constructed by connecting a plurality of computers or other intelligent devices together, a concept called "virtual LAN" (VLAN) employs functionality for arbitrarily and logically grouping terminals or nodes which are connected to switches of the network. Ethernet VLANs according to IEEE 802.1Q allow restricting access to the terminals connected to an Ethernet network within a VLAN as well as restricting the data flow of multicast Ethernet messages to predefined parts of the Ethernet network where receiver terminals are connected which belong to the same VLAN. Hence a VLAN is able to reduce unnecessary network traffic and ensure security.

In Ethernet switch-based networks VLAN definitions are handled within the Ethernet switches. Therefore the latter are configured or otherwise made aware of the relevant VLANs. Specifically, for each port of a switch, the switch knows if a particular incoming VLAN (multicast) message shall be forwarded to this port or not, (i.e. if this port also belongs as output port to the VLAN of the incoming message).

In Ethernet switch-based networks it is assumed that any single connected terminal belongs to one specific VLAN. This terminal can then only talk to other terminals belonging to the same VLAN. When configuring the switches, the ports to these communicating terminals are therefore called access ports, and these access ports are only allowed to belong to one VLAN, while the other ports internal to the communication system, called trunk ports, may belong to several VLANs. As soon as the VLAN IDs of the access ports are known, the switches can automatically determine the VLAN IDs to which the trunk ports must belong.

SA systems based on IEC61850 are configured by a standardized configuration representation or formal system description called Substation Configuration Description (SCD). An SCD file comprises the logical data flow between the IEDs on a "per message" base, i.e. for every message source, a list of destination or receiver IEDs, the message size in terms of data set definitions, as well as the message sending rates for all periodic traffic like GOOSE, SV and Integrity reports. The SCD file likewise specifies the distribution of multicast messages into Virtual Local Area Networks (VLANs) wherein a single IED may send different real time messages for different purposes within different VLANs of the SA communication system. Hence the above concept of access ports is not applied; however the concept of edge ports, i.e. ports which have not to be considered at RSTP loop avoidance algorithm in physically meshed networks, is still valid (in this notation, an edge port connected to an end node or IED that is assigned to one single VLAN corresponds to an access port). This can complicate the configuration of VLANs on the switches.

For large process control systems with increased real time communication needs due to multicast communication traversing the entire system, the communication network load is of interest. This is especially true for multicast GOOSE and SV messages according to IEC 61850, and has an impact on the entire communication system as well as on individual message receivers. In addition the consistency, completeness and/or correctness of the data flow definitions, such as in process control systems with up to 500 IEDs communicating among each other, are not easily verified or even visualized.

SUMMARY

A method is disclosed of analyzing a communication configuration of a process control (PC) system with plural intelligent electronic devices (IEDs) connected to an Ethernet switch-based communication network, wherein a sender IED is configured to send different messages to different predetermined receiver IEDs, and wherein a switch of the communication network is configured to forward periodic multicast messages irrespective of the receiver IEDs, the method comprising: retrieving, for a sender IED of the plural IEDs and for each message configured to be transmitted by the sender IED, from a standardized configuration representation of the PC system having logical data flow definitions, receiver IEDs for which the message is destined; and evaluating, for a receiver IED of the plural of IEDs, all messages destined for the receiver IED.

An engineering tool is disclosed for process control (PC) system with a plurality of intelligent electronic devices (IEDs) connected to an Ethernet switch-based communication network, wherein a sender IED is configured to send different messages to different predetermined receiver IEDs, and wherein a switch of the communication network is configured to forward periodic multicast messages irrespective of the receiver IEDs, the engineering tool comprising: means for retrieving, for a sender IED of the plural IEDs and for each message configured to be transmitted by said sender IED, from a standardized configuration representation of the PC system having logical data flow definitions, receiver IEDs for which the message is destined; and means for evaluating, for a receiver IED of the plural of IEDs, all messages destined for the receiver IED.

BRIEF DESCRIPTION OF THE DRAWINGS

The subject matter of the disclosure will be explained in more detail in the following text with reference to exemplary embodiments which are illustrated in the attached drawings, of which:

FIG. 2 is an excerpt of an exemplary SCL file with a formal configuration description of an IED.

DETAILED DESCRIPTION

Figure 1:
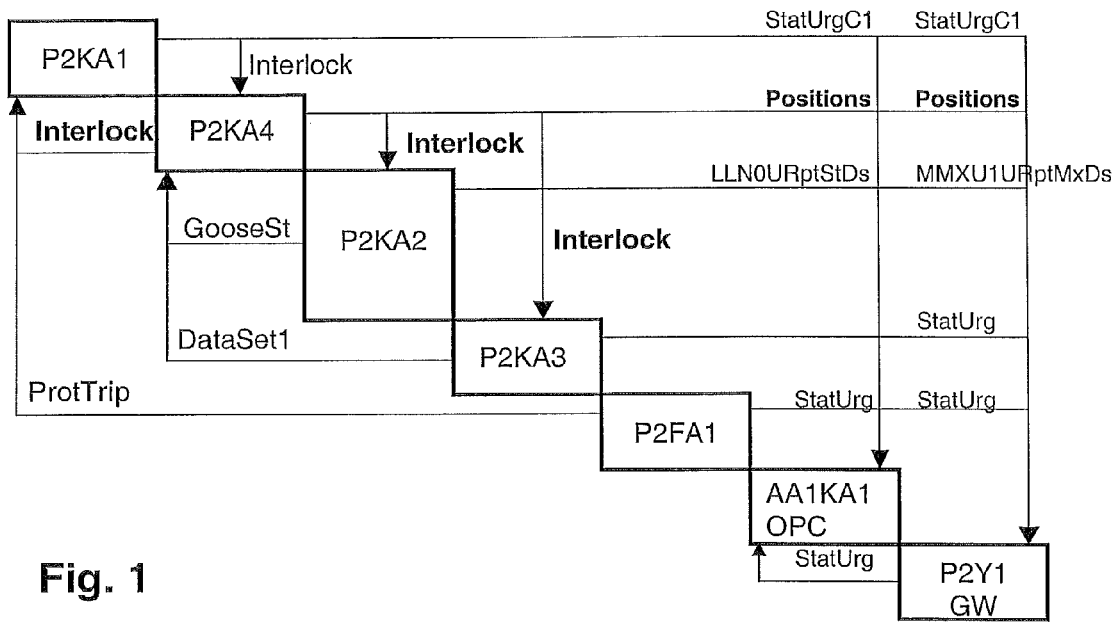
FIG. 1 is an exemplary function chart of logical data flow between plural IEDs.

Exemplary embodiments as disclosed herein are directed to preventing communication disruption in communication networks of process control (PC) or substation automation (SA) systems with plural intelligent electronic devices (IEDs). A method of analyzing a communication configuration and an engineering tool are disclosed herein.

Principles and methods of the following disclosure are not restricted to a use in substation automation, but are likewise applicable to, for example, other process control systems with a standardized configuration description. For example IEC 61850 is also an accepted standard for hydro power plants, wind power systems, and distributed energy resources (DER).

According to the disclosure, communication in an exemplary PC or SA system is analyzed by evaluating, in a particular manner, any and/or every network message, and/or respective message source, configured for transmission across a communication network of the system. From a logical data flow description that is part of a standardized configuration representation of the PC or SA system and which includes, in the form of control blocks, formal information for every message, receiver IEDs are retrieved or determined. For each retrieved receiver IED, the totality of all network messages destined for or directed to this particular receiver IED can be evaluated or processed, (e.g., in view of a subsequent network load analysis, Virtual Local Area Network assignment, or graphical display of the data flow). Exemplary network messages of interest include cyclic point-to-point reports, as well as, in terms of IEC 61850, periodic or repeated real-time multicast messages (Sampled Values SV) and event-based multicast messages (Generic Object Oriented Substation Events GOOSE).

In an exemplary variant of the disclosure, formal information about individual messages such as size or sending rate can be retrieved from the standardized configuration representation, consolidated or grouped per receiver IED, and evaluated in order to determine a network load situation at the receiver IED. For event based reports, the formal information retrieved can, for example comprise a general data change rate indicative of a normal state data flow, (e.g., 1 message/s for a measurand message source reporting event-based measurement changes of one bay), as well as a burst size indicative of a maximum or worst-case peak load, (e.g., 5 messages within 200 ms for the above measurand message source, plus 5 messages per event source with switch position changes, protection trips or supervision alarms). Hence, for every receiver IED, the normal and exceptional network load can be calculated in advance based on a prediction of the messages received under various circumstances and, for example, implicitly assuming that appropriate switch port output filters at the edge port to which the receiver IED is connected actually prevent multicast messages from being forwarded to the receiver IED under consideration.

In another exemplary variant, the formal information retrieved comprises the Virtual Local Area Network Identifiers (VLAN IDs) of the messages destined to the receiver IED. By knowing the relevant VLAN IDs at the receiver IED, any or all unnecessary multicast messages can be filtered out at the switch to which the IED is directly connected, and the receiver IED can be relieved from these unsolicited multicast messages. In this context, and as stated previously, different network messages, even if originating from the same sender IED, may be directed to different receiver IEDs, which precludes the use of known VLAN concepts in order to determine the situation at individual receiver IEDs.

In a further exemplary embodiment of the disclosure, a Three-Dimensional (3D) representation of the data flow between the IEDs is generated by, at the same time, maximizing the distance between any two IED representations, and minimizing the distance between the representations of any two communicating IEDs. This can provide for a balanced distribution of the IED representations within a given volume. In combination with suitable rotation of the resulting configuration and/or variation of the position of an observer, this representation can enable fast and easy discovery, by a knowledgeable engineer, of any inconsistency, incorrectness and/or incompleteness in data flow configuration.

The inter-IED distances can, for example, optimized by assigning repulsive and attractive forces to any two IEDs or to any two communicating IEDs, or to their data flow connection, respectively. Pertinent formal information (such as e.g., message type and size) can be coded in the 3D representation by color, line thickness or the like.

The present disclosure also relates to a computer program product including computer program code for controlling one or more processors of an engineering/analyzing tool or other device adapted to be connected to a communication network of an SA or PC system and configured to store a standardized configuration representation of the SA or PC system, such as a computer program product including a computer readable medium containing therein the computer program code for implementing methods as disclosed herein.

Known performance calculations for communication systems can be performed manually with some assumptions about performance scenarios and protocol structure of the communication telegrams. This is feasible as long as, for example, the communication traffic is mainly star shaped to a few station level devices, and the load from the bay level devices is roughly the same for each bay and can therefore just be multiplied. However, in case the new communication facilities like generic object oriented substation events (GOOSE) and Sampled Values (SV) as defined in IEC 61850 are used between arbitrary IEDs and, for example, if multicast messages are not restricted by a Virtual Local Area Network (VLAN) configuration and thus create an unsolicited load at IEDs which do not really need the multicast information, the situation changes.

FIG. 1 is a function chart showing an exemplary configured communication or logical data flow between intelligent electronic devices (IEDs) of an exemplary substation automation (SA) system. This type of representation is not very practical for systems with up to, for example, 500 communicating IEDs.

The substation configuration (SCD) description according to IEC 61850 comprises a communication section with, in addition to the control blocks for event based reporting, control blocks for real-time based messages (GOOSE and SV) to be sent within a logical sub-network, (e.g., a physical Ethernet segment in which every IED can reach any other connected IED without intervening routers). The GOOSE and SV control blocks identify all the senders of VLAN related messages. If they do not already comprise an assignment to a VLAN, a unique and unambiguous VLAN identifier may be assigned to the control block when desired, and based on user defined message classes. Contrary to multicast GOOSE and SV, the reported events can be directed to one dedicated receiver IED only.

FIG. 2 shows an excerpt of an exemplary SCL file, specifically concerned with the IED P2KA4 of the SA communication system introduced in FIG. 1. The parts of the SCL file reproduced in FIG. 2 define the data set "positions", the data flow from the specific IED as a source for unbuffered reports ("e.g. "position" to Gateway P2Y1 and OPC Server AA1KA1) and GOOSE messages (e.g. "interlock" to IEDs P2KA3, P2KA1, P2KA2), as well as a VLAN identifier ("VLAN-PRIORITY" 4) and sending frequency (MinTime, MaxTime) as exemplary formal information for GOOSE interlocking messages.

More generally, the SCD description specifies for each control block, (e.g., for each message type or corresponding message source/service class), the receiver or intended destination IEDs, thus defining the logical data flow. From this information, by transferring the sender's VLAN ID to all receivers, the totality of VLAN IDs of all receivers is defined as well. Additionally the control blocks comprise formal information about the sending rate (e.g., SV sample rate, GOOSE maxtime & mintime, integrity period of reports) and a reference to a data set, the analysis of which leads to number of data values and message sizes sent.

By using this information and adding for event based reports a normal state data change rate, (e.g., one changed value per second and control block implying one message of 1000 bits), and a burst change size, (e.g., 5 messages per event related control block), the average normal load as well as load peaks can be calculated for each receiver IED. The calculated loads consider the routing restrictions caused by correct application of the VLANs within the connecting switch network, (e.g., the results are valid for a communication system with properly configured VLANs). By comparison with the appropriate IED processing rates, this indicates if the receivers are overloaded in normal case, and how long it takes to handle a burst.

The table below shows the result of an exemplary performance calculation for the IEDs and/or the SA communication system introduced in FIG. 1. The table lists, per IED, a received load at normal state (average bit rate, column 2; message rate, column 3), as well as the number of burst messages based on GOOSE repetitions in the event case (column 4) and a VLAN identifier (column 5). The IED named P2FA1 does only send messages and hence is disregarded in the table.

| IED name | kBit/s | Msgs/s | Burst msgs | VLAN IDs |
|---|---|---|---|---|
| P2KA1 | 2 | 2 | 6 | 222 111 |
| P2KA4 | 7 | 3 | 9 | 111 |
| P2KA2 | 1 | 1 | 3 | 111 |
| P2KA3 | 1 | 1 | 3 | 111 |
| AA1KA1 | 5 | 5 | 25 | |
| P2Y1 | 5 | 5 | 25 | |

Figure 3:
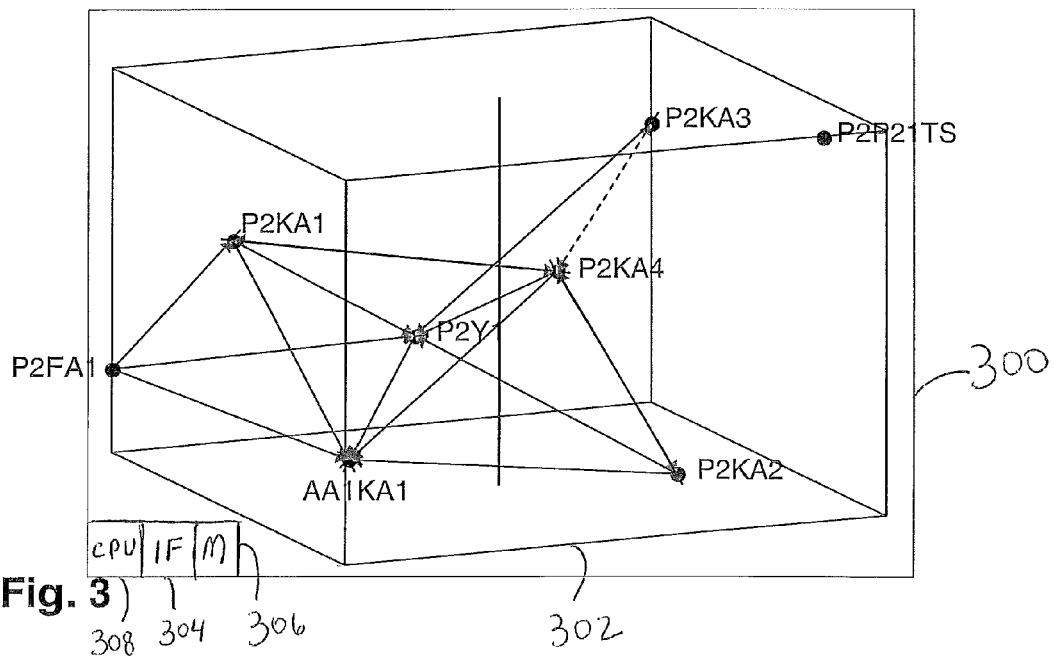
FIG. 3 is an exemplary engineering tool displaying a 3D representation of a logical data flow.
Figure 4:
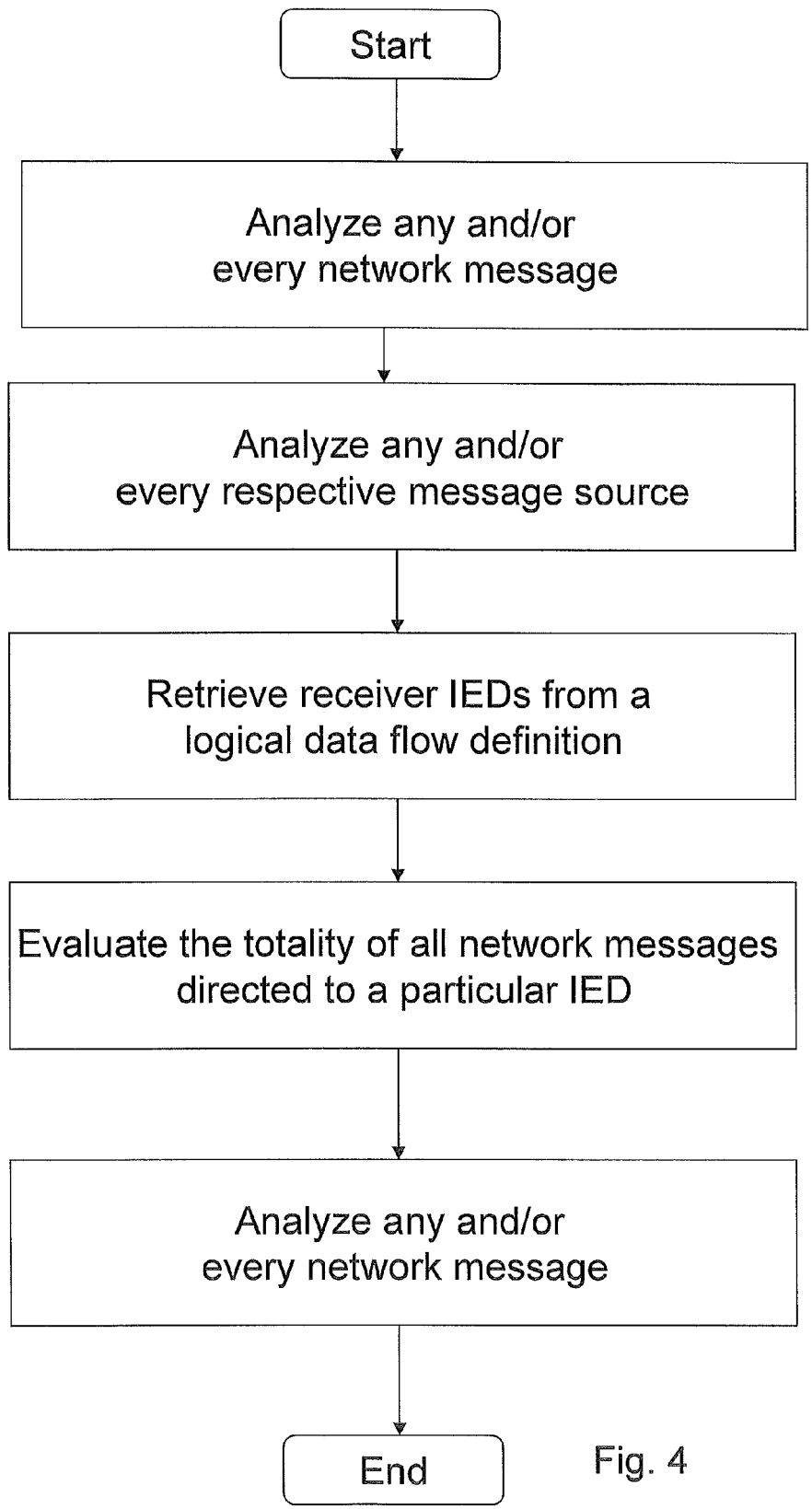
FIG. 4 is an exemplary flow chart.

FIG. 3 can be considered an engineering tool 300 which outputs an exemplary automatically generated Three-Dimensional (3D) representation of the data flow which, due to its building algorithm as further detailed below, depicts symmetrical flows in a symmetrical way. The FIG. 3 tool can be considered to include an optical display 302 as a means for displaying the representation. With some experience in interpreting the depicted structures, the optical display can be inspected by a user for irregularities in the data flow of even large communication systems may be spotted and their origin identified (e.g., are they intended or rather engineering faults such as a missing data connection?)

The FIG. 3 engineering tool can be considered to include means for retrieving receiver IEDs for which a message is destined, such as any known and suitable interface 304 configured as a processor and/or software module. The receiver IEDs can be retrieved from a memory 306 that stores a standardized configuration representation of a PC system having logical data flow definitions. The interface 304 can include or be associated with a separate subprocessor and/or software module 308 as a means for evaluating all messages destined for a receiver IED (i.e., for any given one or more of the receiver IEDs). The generation of the exemplary 3D representation is as follows:

1. IEDs are placed randomly into a cube or any other arbitrarily shaped volume. IEDs have a repulsive force between each other, which leads to a scattering of the IEDs at the surface of the cube or volume.

2. Each data flow from a sending IED to a receiving IED is represented by a connecting line or arrow and modelled by adding an attractive force between the two IEDs.

3. The usage of attractive and repulsive forces leads to a 3D representation of the system and the data flow between the IEDs within the cube. This 3D presentation is projected onto a 2D plane to be presented on a screen and can (manually or automatically) be rotated in the 2D plane to investigate its shape and properties.

The exemplary 3D representation of the FIG. 3 tool shows clusters of tightly connected IEDs and thus helps in designing the physical structures according to the functional needs concerning message throughput as well as availability. The 3D representation can further be enhanced by using higher attractive forces for higher message load of a data flow connection, and different line color or thickness depending on used services and resulting load, as well as by highlighting overloaded IEDs, or depicting relative loads, in case that the processing capacities or physical limits of the receiver IEDs are known. Finally, if a certain type of data flow or a certain application shall be investigated, different filtering criteria like VLAN ID, data set names, application IDs and subNetworks can be used to filter the data flow used for the 3D representation.

The engineering/analysis tool configured to perform the foregoing analysis may be extended to become a testing/supervision tool by including on-line data. Combining the 3D representation with a health state of the IEDs as determined during operation, and/or with (non-)received messages, and representing these faults (e.g., failing IED or disrupted data flow connection in red color), enables a knowledgeable engineer to easily understand or anticipate the consequences for the communication system.

If the foregoing analysis is performed at a functional level, (e.g., directed to logical devices, or even logical nodes, according to IEC 61850 instead of physical IEDs), an optimal clustering of functions onto physical IEDs can be derived. By way of example, control and interlocking functionality may, from a communication load perspective, advantageously be combined onto a single dedicated IED, whereas protection functions are located on, or hosted by, a number of different IEDs.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of analyzing a communication configuration of a process control (PC) system with plural intelligent electronic devices (IEDs) connected to an Ethernet switch-based communication network, wherein a sender IED is configured to send different messages to different predetermined receiver IEDs, and wherein a switch of the communication network is configured to forward periodic multicast messages irrespective of the receiver IEDs, the method comprising:
   retrieving, for each message configured to be transmitted by the sender IED to the predetermined receiver IED, a logical data flow definition from a standardized configuration representation of the PC system; and
   evaluating, for the predetermined receiver IED of the plural IEDs, the logical data flow definition of all messages destined for the receiver IED.

2. The method according to claim 1, comprising:
   determining, for each receiver IED, a communication load based on the consolidated formal information.

3. The method according to claim 2, comprising:
   retrieving, for event based reports, a general data change rate and a burst size.

4. The method according to claim 1, comprising:
   retrieving, for the sender IED and for each message transmitted by the sender IED, from the standardized configuration representation of the PC system, a virtual local area network identifier (VLAN ID);
   consolidating, for the receiver IED, VLAN IDs of all messages destined for the receiver IED; and
   assigning a consolidated VLAN ID to an edge port of a switch of the communication network to which the receiver IED is connected.

5. The method according to claim 1, comprising:
   generating a three-dimensional (3D) representation of the plural IEDs with a maximum distance between any two IEDs and a minimum distance between any two IEDs exchanging messages; and
   displaying the 3D representation for optical inspection.

6. The method according to claim 5, comprising:
   maximizing a distance between any two IEDs by defining a repulsive force, and minimizing the distance by defining an attractive force between IED representations; and
   retrieving, from the standardized configuration representation, formal information, and coding the formal information in the 3D representation.

7. An engineering tool for a process control (PC) system with a plurality of intelligent electronic devices (IEDs) connected to an Ethernet switch-based communication network, wherein a sender IED is configured to send different messages to different predetermined receiver IEDs, and wherein a switch of the communication network is configured to forward periodic multicast messages irrespective of the receiver IEDs, the engineering tool comprising:
   a processor configured to:
      retrieve for each message configured to be transmitted by the sender IED to the predetermined receiver IED, a logical data flow definition from a standardized configuration representation of the PC system; and
      evaluate, for the predetermined receiver IED of the plural IEDs, the logical data flow definition of all messages destined for the receiver IED.

8. The engineering tool according to claim 7, wherein
   the processor being configured to determine, for the receiver IED, a communication load based on the consolidated formal information.

9. The engineering tool according to claim 7, wherein in evaluating the messages the processor consolidates, for the receiver IED, virtual local area network identifiers (VLAN IDs) of all messages destined for the receiver IED; and
   the processor being configured to assign a consolidated VLAN ID to an edge port of a switch of the communication network to which the receiver IED is connected.

10. The engineering tool according to claim 7, wherein in evaluating the messages the processor generates a three-dimensional (3D) representation of the plural of IEDs with a maximum distance between any two IEDs and a minimum distance between any two IEDs exchanging messages, and:
   the processor being configured to display the 3D representation for optical inspection.

11. The method according to claim 1, wherein the PC system is a substation automation (SA) system.

12. The engineering tool according to claim 7, wherein the PC system is a substation automation (SA) system.

13. The method according to claim 1, wherein the formal information includes at least one of:
a size of a message, a sending rate of a message, a data change rate, a burst size indicative of a maximum or worst-case peak load, and a Virtual LAN Identifiers of the messages destined to the receiver IED.

14. The method according to claim 1, wherein the source IED and the receiver IEDs are end devices on the network.

15. The engineering tool according to claim 7, wherein the formal information includes at least one of:
a size of a message, a sending rate of a message, a data change rate, a burst size indicative of a maximum or worst-case peak load, and a Virtual LAN Identifiers of the messages destined to the receiver IED.

16. The engineering tool according to claim 7, wherein the source IED and the receiver IEDs are end devices on the network.

\* \* \* \* \*